United States Patent [19]

Nakamura et al.

[11] 3,929,671

[45] Dec. 30, 1975

[54] AUTO EXHAUST CONTROL CATALYST ON SILICA CLOTH SUPPORT

[75] Inventors: Harutoki Nakamura, Toyonaka; Jun Yagi, Kyoto, both of Japan

[73] Assignee: Matsushita Electric Industrial Co., Ltd., Osaka, Japan

[22] Filed: Dec. 5, 1973

[21] Appl. No.: 421,808

Related U.S. Application Data

[63] Continuation-in-part of Ser. No. 165,094, July 23, 1971, abandoned.

[30] Foreign Application Priority Data

July 30, 1970 Japan.............................. 45-67149

[52] U.S. Cl.............. 252/455 R; 252/458; 252/460; 252/459; 252/477 R; 106/52; 106/54
[51] Int. Cl.²............................................ B01J 29/06
[58] Field of Search........ 252/455 R, 458, 460, 459, 252/477 R; 106/52, 54

[56] References Cited
UNITED STATES PATENTS

| | | | |
|---|---|---|---|
| 3,189,563 | 6/1965 | Hauel.............................. | 252/459 X |
| 3,691,097 | 9/1972 | Stiles et al.................... | 252/455 R X |
| 3,804,647 | 4/1974 | Elmer et al...................... | 106/52 X |

*Primary Examiner*—Paul F. Shaver
*Attorney, Agent, or Firm*—Stevens, Davis, Miller & Mosher

[57] ABSTRACT

A catalyst for purification of exhaust gas from automobiles comprises silica cloth having a silica content of at least 91 wt. percent and an alkali content of not more than 0.1 wt. percent as a substrate, the silica cloth being prepared by dealkalizing glass fiber cloth with an acid to a silica content of at least 91 wt. percent and an alkali content of not more than 0.1 wt. percent, and heating the dealkalized glass fiber cloth at 500° to 1,100°C to recrystallize surfaces of the cloth once through semi-melting, 0.1 to 10 wt. percent of at least one of inorganic powders consisting of γ-alumina, magnesia, silica, titania, and zirconia and 0.01 to 20 wt. percent of at least one of platinum, palladium, rhodium, ruthenium, cobalt, iron, nickel, copper, manganese, and chromium as a catalytic material, said inorganic powders and catalytic component being borne on the silica cloth. The catalyst is prepared by dealkalizing glass fiber cloth with an acid to a silica content of at least 91 wt. percent and an alkali content of not more than 0.1 wt. percent, heating the dealkalized glass fiber cloth at 500° to 1,100°C, thereby recrystallizing surfaces of the cloth once through semi-melting, dipping the cloth in an aqueous or an aqueous alcoholic solution containing at least one of inorganic powders of γ-alumina, magnesia, silica, titania, and zirconia and at least one of salts of platinum, palladium, rhodium, ruthenium, cobalt, iron, nickel, copper, manganese and chromium as a catalytic material, drying the silica cloth at 40°C to 120°C and calcining the same at 300°C to 400°C for 30 minutes to 2 hours.

3 Claims, 3 Drawing Figures

AUTO EXHAUST CONTROL CATALYST ON SILICA CLOTH SUPPORT

This is a continuation-in-part application of copending Patent application Ser. No. 165,094 filed in July 23, 1971, now abandoned.

This invention relates to a catalyst for preventing atmospheric pollution, and more particularly to a method for preparing a catalyst to be used in an apparatus for purifying an exhaust gas from an automobile engine or a flue gas when heavy oil is combusted.

An apparatus for purifying the exhaust gas for automobiles using the present novel catalyst has the following advantages:

1. The apparatus can be provided in an exhaust gas line, and hardly increases a fuel consumption ratio and lowers a driving performance of the automobile.

2. Characteristics of the catalyst are excellent and particularly the catalyst works at a low temperature. The space velocity is high and the catalyst continues to work even at a low temperature. Therefore, the apparatus for purification can be started to work at a low speed of the automobile. The purification efficiency of the apparatus can be maintained high throughout the driving, and the amount of the catalyst used is so small that the apparatus can be made more compact and smaller.

3. As the catalyst that takes a large part in a cost, a metal oxide or a small amount of noble metal is used, and therefore the catalyst has a low manufacturing cost. Consequently, the apparatus for purifying the exhaust gas from the engine can be provided at a low cost.

According to an effective method for purifying the exhaust gas from the automobile, carbon monoxide and hydrocarbons, which are uncombusted fuel, are converted to carbon dioxide or a mixture of carbon dioxide and water by oxidation. The oxidation of uncombusted components by the catalyst can be carried out with a high conversion, and the uncombusted components can be more readily oxidized. Therefore, the method based on the oxidation by the catalyst is an effective method. However, such method requires a catalyst and the conversion greatly depends upon the characteristics of the catalyst. Therefore, it is necessary to provide a catalyst having a wide applicability, good characteristics and low cost. Heretofore, several catalysts have been proposed, but an object of the present invention is to provide a novel catalyst and a novel process for preparing the same.

The present invention provides a catalyst for purification of exhaust gas from automobiles, which comprises silica cloth having a silica content of at least 91 wt. percent and an alkali content of not more than 0.1 wt. percent as a substrate, the silica cloth being prepared by dealkalizing glass fiber cloth with an acid to a silica content of at least 91 wt. percent and an alkali content of not more than 0.1 wt. percent, and heating the dealkalized glass fiber cloth at 500° to 1,100°C to recrystallize surfaces of the cloth once through semi-melting, at least one of inorganic powders consisting of γ-alumina, magnesia, silica, titania, and zirconia and at least one of platinum, palladium, rhodium, ruthenium, cobalt, iron, nickel, copper, manganese, and chromium as a catalytic material, said inorganic powders and catalytic component being borne on the silica cloth, more preferably the catalyst wherein the catalyst contains 0.01 to 20 wt. percent of the catalytic material and 0.1 to 10 wt. percent of the powders.

Further, the present invention provides a process for preparing a catalyst for purification of exhaust gas from automobiles, which comprises dealkalizing glass fiber cloth with an acid to a silica content of at least 91 wt. percent and an alkali content of not more than 0.1 wt. percent, heating the dealkalized glass fiber cloth at 500° to 1100°C, thereby recrystallizing surfaces of the cloth once through semi-melting, dipping the cloth in an aqueous or an aqueous alcoholic solution containing at least one of inorganic powders of γ-alumina, magnesia, silica, titania, and zirconia and at least one of salts of platinum, palladium, rhodium, ruthenium, cobalt, iron, nickel, copper, manganese and chromium as a catalytic material, drying the silica cloth at 40°C to 120°C and calcining the same at 300°C to 400°C for 30 minutes to 2 hours.

Now, the present invention will be explained in detail as to the case where the exhaust gas from the automobile is purified, referring to the accompanying drawings.

Figure 1:
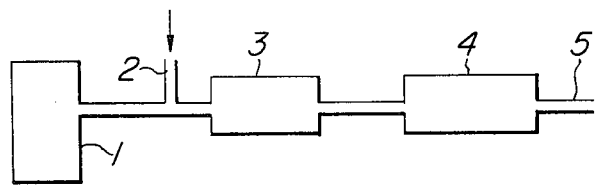
FIG. 1 is a schematic view showing a general exhaust gas-purifying system.
Figure 2:
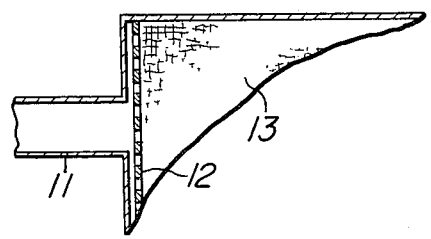
FIGS. 2 and 3 show structures of apparatuses for contacting a catalyst with a mixture of the exhaust gas and air.
Figure 3:
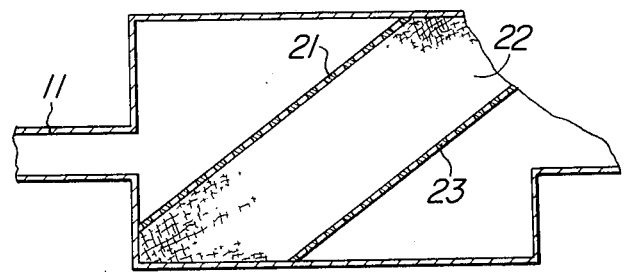

In FIG. 1, an exhaust gas from an automobile engine 1 is passed through a line provided with an air inlet 2, and admixed with air fed from the air inlet 2 by an air pump and a feeding device of venturi tube structure. Then, the mixture of the exhaust gas and air is passed through an apparatus 3 for contacting the mixture with a catalyst and a muffler 4, and vented to the atmosphere from a tail pipe 5. The present catalyst is used in said apparatus 3. The structure of the apparatus 3 is well known and its examples are shown in FIGS. 2 and 3. That is to say, in FIG. 2, a metallic net or perforated plate 12 is provided at one end in a direction perpendicular to the axial direction within a suitable metallic casing 11 and another net or plate is provided at the downstream end therein (not shown) in the similar manner and a catalyst 13 is placed between these nets or plates. In FIG. 3, another example of the structure of the apparatus is shown, where the similar nets or perforated plates 21 and 23 are provided at some distance in parallel in an inclined direction, and a catalyst 22 is provided between the nets or plates.

Now, the present invention will be described in detail, referring to examples, where the present catalyst is applied to an apparatus for purifying the exhaust gas from the automobile.

EXAMPLE 1

Fabrics woven from bundles of glass fibers are dipped in a strong acid, such as about 40 wt. percent sulfuric acid, heated and vibrated in the acid to extract alkali components or boro-silicate components from the glass fibers, that is, dealkalize the fabrics, and as a result, the silica content of the fabrics is enhanced. These steps for obtaining the silica cloth belong to well known art. The dipped fabrics are heated in the atmosphere at a temperature of 500° to 1,100°C for 2 to 8 hours to recrystallize surfaces of the cloth once through semi-melting and obtain silica cloth having recrystallized surfaces. The heat treatment is indispensable for preparing catalysts of the present invention. The raw material glass fibers generally contain 50 to 70 percent by weight of silica, and especially if it is easy to obtain a high temperature in a step for preparing glass fibers, the glass fibers having said range of silica content can be obtained. The reason why the glass fibers subjected to the extraction of alkali components by the acid are used in the present invention is that, in addition to the relatively low cost, easy preparation and a broad range of uses of the glass fibers the small pores formed through the extraction by the acid are suitable for preparation of catalysts.

It is necessary that the silica cloth thus prepared has a silica content of 91 percent or more. The silica cloth having a silica content of 91 to 99.9 percent can be prepared by the acid treatment. The silica cloth having a silica content of less than 91 percent has a low heat resistance and undergoes melting or breakage at a high temperature. Furthermore, it is necessary that the silica cloth has an alkali content of not more than 0.1 percent at the same time. The alkali component may cause to bring the silica cloth into a semi-molten state. The silica cloth prepared under these necessary conditions can withstand a high temperature such as 900°C to 1,200°C.

Then, the silica cloth is dipped in a dilute ethyl alcohol solution containing 4.7 percent by weight of chloroplatinic acid and 10 percent by weight of powders of $\gamma$-alumina, while stirring the solution. The silica cloth can absorb about 0.5 percent maximum by weight of the solution after said heating, but when the silica cloth is heated at 150° to 200°C in advance to the dipping, the absorption of the solution of chloroplatinic acid can be carried out exactly, and the contents of the $\gamma$-alumina powders and platinum to be borne can be exactly controlled.

After the dipping, the silica cloth is dried at 40° to 120°C, and then heated at 300° to 400°C for 30 minutes to 2 hours to bear the $\gamma$-alumina powders and platinum on the surface of silica cloth. 0.4 percent by weight of platinum is borne on the silica cloth, based on the total weight of the catalyst, and 5 percent by weight of $\gamma$-alumina is borne on the silica cloth, based on the total weight of the catalyst. The amount of platinum to be borne depends upon the required characteristics of the catalyst, but it is possible to deposit 0.01 to 20 percent by weight of platinum onto the silica cloth, based on the total weight of the catalyst, and also it is possible to deposit 0.1 to 10 percent by weight of $\gamma$-alumina onto the silica catalyst. In the case of less than 0.1 percent by weight of $\gamma$-alumina, no remarkable effect can be obtained, and in the case of more than 10 percent by weight, there is a high possiblity of removal of $\gamma$-alumina from the silica cloth. Since the silica cloth contacts the exhaust gas, it is necessary that a gas passage resistance of the silica cloth is made smaller. That is, it is appropriate that 2 to 10 yarns each of warps and wefts are provided in an area of 1 cm², and sizes of yarns are about 0.3 to 3 mm. Particularly, it is desirable that the cloth must be woven by binding the wefts with warps, and any dislocation is hard to take place when bundles of a plurality of wefts are bound with the warps.

When the catalyst is used at such a location that no heat resistance is required, that is, the catalyst temperature does not exceed 400°C during the reaction, a catalyst layer can be formed on a fabric of glass fibers, not treated with such a strong acid as sulfuric acid to remove the alkaline component from the glass fibers, as a catalyst carrier. However, it has been found better to carry out the dealkalization, because the characteristics of the apparatus for purifying the exhaust gas can be improved, if the catalyst can withstand a higher temperature.

EXAMPLE 2

Catalyst fabrics are prepared in the same manner as in Example 1, using an aqueous dipping solution containing 10 percent by weight of $\gamma$-alumina powders and further containing the following components per 400 parts by weight of water of the solution.

| | |
|---|---|
| Manganese nitrate | 200 parts by weight |
| Copper nitrate | 40 parts by weight |
| Cobalt nitrate | 25 parts by weight |

EXAMPLES 3 – 5

Catalyst fabrics are prepared in the same manner as in Example 1, using aqueous dipping solutions containing 10 percent by weight of $\gamma$-alumina powders and further containing the following components per 100 parts by weight of water of the solution:

| Example 3 | |
|---|---|
| Nickel acetate | 50 parts by weight |
| Copper acetate | 30 parts by weight |
| Chromium acetate | 5 parts by weight |
| Example 4 | |
| Cobalt nitrate | 100 parts by weight |
| Copper nitrate | 30 parts by weight |
| Chromium nitrate | 5 parts by weight |
| Example 5 | |
| Nickel acetate | 100 parts by weight |
| Manganese acetate | 40 parts by weight |
| Cobalt acetate | 15 parts by weight |

In these 1 – 5 Examples, the kind of metal salts are different, but the finally formed catalyst layers are in the following oxide forms:

| | |
|---|---|
| For cobalt: | Cobalt oxides ($Co_3O_4$, $Co_2O_3$, CoO, etc.) |
| For copper: | Copper oxides (CuO, $Cu_2O$, etc.) |
| For chromium: | Chromium oxides ($Cr_2O_3$, etc.) |
| For nickel: | Nickel oxides (NiO, $Ni_2O_3$, etc.) |
| For manganese: | Manganese oxides (MnO, $MnO_2$, $Mn_2O_3$, etc.) |

EXAMPLE 6

The silica cloth of Example 1 is dipped in an aqueous solution containing 5 percent by weight of silica sol after the heat treatment, dried, and then heated at 400° to 600°C for 1 to 4 hours to deposit 5 percent by weight of silica onto the surface of silica cloth as a surface layer, based on the weight of the silica cloth. Then, a catalyst having 5 percent by weight of $\gamma$-alumina and 0.4 percent by weight of platinum, based on the total weight of the catalyst, is prepared in the same manner as in Example 1.

The deposition of the silica onto the surface of silica cloth as a carrier can be applied to all of the examples, and 0.5 to 15 percent by weight of silica thus deposited can increase a surface area of the catalyst, and the deposited silica is never removed from the carrier.

EXAMPLE 7

0.25 percent by weight of chromium naphthenate is added to the alcoholic solution of chloroplatinic acid of Example 1, and a catalyst containing 0.05 percent by weight of chromium metal in a crystal structure of $Cr_2O_3$ is finally prepared in the same manner as in Example 1.

It is possible in all the examples to dissolve 0.1 to 3 percent by weight of an organic chromium such as chromium naphthenate, chromium acetylacetonate, chromium oxychloride and chromium stearate into an alcoholic solution or aqueous solution as the dipping solution, thereby preparing catalysts containing 0.001 to 0.1 percent by weight of chromium metal in the form of chromium oxide as a promoter.

EXAMPLES 8 – 14

Catalysts are prepared in the same manner as in Example 1, using a solution containing powders of at least one of magnesia, silica, titania and zirconia or in addition to γ-alumina in place of single γ-alumina, and at least one of salts of platinum, palladium, rhodium and ruthenium as a catalytic material in water or alcohol, or containing further salts of at least one of cobalt, iron, nickel, copper, manganese and chromium. That is, the silica cloth carrier as prepared in the manner as in Example 1 is dipped in the solution, dried and calcined to deposit said metal or metallic oxide of said catalytic material onto the silica cloth carrier.

In that case, the silica cloth carrier can be treated with an aqueous ammonia solution in advance, thereby depositing the ammonia solution onto the carrier, then dipping the treated carrier into the solution of the catalytic materials to effect ion exchange, then reduced with a suitable reducing agent, for example, hydrazine, thereby producing a highly dispersed catalyst, or with a reducing gas, for example, hydrogen, carbon monoxide, etc. thereby increasing its activity. These treatments can be applied to all of the present examples.

Typical five catalysts thus prepared are given below as Examples 8 – 14.

EXAMPLE 8

Catalyst containing 2 percent by weight of magnesia, 5 percent by weight of silica, 0.05 percent by weight of platinum, 0.2 percent by weight of palladium, 0.1 percent by weight of ruthenium, the balance being silica cloth.

EXAMPLE 9

Catalyst containing 5 percent by weight of silica, 1 percent by weight of titania, 1 percent by weight of magnesia, 7 percent by weight of γ-alumina, and 0.4 percent by weight of palladium, the balance being silica cloth.

EXAMPLE 10

Catalyst containing 2 percent by weight of magnesia, 5 percent by weight of silica, 0.05 percent by weight of platinum, 0.2 percent by weight of palladium, 0.1 percent by weight of ruthenium, and 0.05 percent by weight of chromium in $Cr_2O_3$ coming from an organic chromium, the balance being silica cloth.

EXAMPLE 11

Catalyst containing 5 percent by weight of silica, 1 percent by weight of titania, 1 percent by weight of magnesia, 7 percent by weight of γ-alumina, 0.4 percent by weight of palladium, and 0.05 percent by weight of chromium in $Cr_2O_3$ coming from an organic chromium, the balance being silica cloth.

EXAMPLE 12

Catalyst containing 5 percent by weight of silica, 5 percent by weight of alumina, 0.5 percent by weight of titania, 10 percent by weight of cobalt in $Co_3O_4$, 7 percent by weight of copper in CuO, 1.2 percent by weight of chromium in $Cr_2O_3$ coming from an organic chromium and 0.5 percent by weight of iron in $Fe_2O_3$, the balance being silica cloth.

EXAMPLE 13

Catalyst containing 5 percent by weight of silica, 5 percent by weight of titania, 0.1 percent by weight of platinum, 0.05 percent by weight of rhodium, 2 percent by weight of nickel in nickel oxide, and 2 percent by weight of copper in copper oxide, the balance being silica cloth.

EXAMPLE 14

Catalyst containing 3 percent by weight of silica, 4 percent by weight of magnesia, 2 percent by weight of γ-alumina, 0.2 percent by weight of palladium and 0.1 percent by weight of ruthenium, the balance being silica cloth.

The foregoing Examples 1 to 14 are summarized in Table 1, and the characteristics of the catalysts are given. For comparison of the characteristics of the catalyst, a catalyst layer consisting of manganese oxide and chromium oxide was formed on a surface of pellets of aluminum oxide ($Al_2O_3$) fired at a high temperature as carrier, and the thus prepared catalyst is listed as the prior art example in the table to make comparison readily. In the table, the percent purification characteristic refers to the carbon monoxide among all the noxious components contained in automobile exhaust gas, which takes part in the reaction which takes place in an oxidizing atmosphere containing at least 1 percent by volume of oxygen by means of the catalysts as disclosed in the foregoing examples. The test automobile is provided with a gasoline engine of an exhaust gas volume of about 1,500 CC.

520 g each of the catalysts is used separately by winding the catalyst around a perforated pipe having a diameter of about 40 mm within a case having an inlet and outlet. The exhaust gas is made to pass through the wound catalyst layer from the inside of the perforated pipe outwards. The percent purification is represented by percentage of carbon monoxide converted to carbon dioxide to the total carbon monoxide in the incoming exhaust gas. Though uncombusted hydrocarbons are converted to carbon dioxide and water at the same time, their data are not indicated in the table. Further, when not more than 2 percent of oxygen, preferably not more than 1 percent of oxygen, is used, the nitrogen oxides in the exhaust gas react with CO to form nitrogen gas and carbon dioxide. However, only conversion of CO and hydrocarbons in the oxygen excess atmosphere is shown in the table.

Other characteristics than the percent purification are determined at a space velocity of $4 \times 10^4$ $hr^{-1}$ in an oxidation atmosphere, using the standard gas consisting of one part by volume of $N_2$-balance gas containing 5 percent CO and a half part by volume of air. The maximum space velocity is a value capable of keeping 100 percent conversion determined by increasing the gas volume.

Table

| Example No. | Organic chromium | Percent Purification | Reaction start temp. (°C) | Reaction stop temp. (°C) | Heat resistance limit(°C) | Maximum conversion(%) | Temperature of catalyst during the reaction(°C) | Space velocity at 100 % conversion (× 10⁴ hr⁻¹) |
|---|---|---|---|---|---|---|---|---|
| Prior art Example | None | 48 | 178 | 120 | 700 – 1200 | 72 | 700 – 1200 | 0.8 |
| 1 | None | 95 or higher | 130 – 150 | 40 | 950 or higher | ≅ 100 | 400 – 450 | 20 – 60 |
| 2 | None | " | 80 – 110 | 70 – 80 | " | " | " | 20 – 45 |
| 3 | None | " | " | " | " | " | " | " |
| 4 | None | " | " | " | " | " | " | " |
| 5 | None | " | " | " | " | " | " | " |
| 6 | None | " | 145 | 40 | " | " | " | 20 – 60 |
| 7 | Yes | " | 130 | " | " | " | " | 20 – 50 |
| 8 | None | " | 130 – 150 | " | " | " | " | 20 – 60 |
| 9 | None | " | " | " | " | " | " | " |
| 10 | Yes | " | 125 – 140 | 70 – 80 | " | " | " | " |
| 11 | Yes | " | " | " | " | " | " | " |
| 12 | Yes | 95 or higher | 125 – 140 | 70 – 80 | 850 or higher | 100 | 300 – 350 | 20 – 60 |
| 13 | None | " | 140 – 160 | 40 | " | " | " | 40 – 70 |
| 14 | None | " | " | 45 | " | " | " | 30 – 60 |

The present purification catalyst for exhaust gas from automobile has the following advantages:

1. The percent purification is high. The present catalyst is effective for oxidation reaction of the uncombusted components contained in the exhaust gas, especially CO and hydrocarbons, and also reduction of NO in the less oxygen state. As to the hydrocarbons, the oxidation of $CH_4$ is not better than the oxidation of other hydrocarbons, but is very effective for higher hydrocarbons (the hydrocarbons having a higher molecular weight) such as aromatic hydrocarbons, etc.

2. Catalysts can be borne in a thin layer on the surface of silica cloth, and consequently can work effectively. The form of the catalyst is suitable for the contact with the exhaust gas, and its gas permeation resistance is low. The catalyst has a specific gravity as low as 0.3 – 0.4 g/cc, that is, a light weight. In other words, the present catalyst can be used not only for the exhaust gas from automobiles, but also for oxidation or reduction of flue gas from oil combustors, or evolving solvent vapors in the case of coating or painting.

3. The present catalyst has an increased specific surface area (according to BET method) by depositing inorganic powders onto the silica cloth, that is, a better distribution of the catalytic components. In other words, the present catalyst has an increased catalytic activity. In the present invention, the catalytic effect is improved to a maximum by depositing the most appropriate amount of the inorganic powders onto the silica cloth.

4. The present catalyst has a lower catalysis initiation temperature by use of chromium oxide by treating the catalyst with organic chromium as a pretreating agent. The lower catalysis initiation temperature is effective for prompt initiation of the reaction.

5. The present catalyst can be prepared continuously, since the silica cloth is used as a substrate. That is, the catalyst can be prepared by continuous passage through a pretreating step, catalyst-deposition (dipping) step, drying step and calcination step under well controlled operating conditions. The catalyst thus prepared has uniform and stabilized catalytic properties.

6. The present catalyst is flexible, and thus durable against mechanical vibration. That is, the present caatalyst is not worn out in contrast to the conventional catalyst pellets. Thus, there is no fear of discharge of catalytic components from the tail pipe and the resulting enviromental pollution.

7. Even if there occurs a local heat release while the present catalyst is used, the catalyst is never disintegrated and deteriorated. That is, the present catalyst has a good resistance to thermal shock.

In the foregoing, the present catalyst has been described as an oxidation catalyst for the exhaust gas from automobiles, but can be used as an oxidation catalyst or reduction catalyst for flue gas from oil combustors or hydrocarbon gases from other sources.

1. A process for preparing a catalyst for purification of exhaust gas from automobiles, which comprises dealkalizing glass fiber cloth with sulfuric acid to a silica content of at least 91 wt. percent and an alkali content of not more than 0.1 wt. percent, heating the dealkalized glass fiber cloth at 500° to 1100°C, thereby recrystallizing surfaces of the cloth once through semi-melting, dipping the cloth in an aqueous or an aqueous alcoholic solution containing at least one of inorganic powders of γ-alumina, magnesia, silica, titania, and zirconia and at least one of salts of platinum, palladium, rhodium, ruthenium, cobalt, iron, nickel, copper, manganese and chromium as a catalytic material, drying the silica cloth at 40° to 120°C and calcining the same at 300° to 400°C for 30 minutes to 2 hours.

2. A process according to claim 1, wherein the solution contains a corresponding amount of the inorganic powders to 0.1 to 10 wt. percent of those borne on the catalyst.

3. A process according to claim 1, wherein the solution contains a corresponding amount of the catalytic materials to 0.01 to 20 wt. percent of those borne on the catalyst.

* * * * *